United States Patent [19]
Ge

[11] Patent Number: 5,829,817
[45] Date of Patent: Nov. 3, 1998

[54] VEHICLE SUNSHADE MOUNTING FASTENER

[75] Inventor: Yao Ge, Clinton Township, Mich.

[73] Assignee: TRW Inc., Cleveland, Ohio

[21] Appl. No.: 716,102

[22] Filed: Sep. 19, 1996

[51] Int. Cl.⁶ .................................................. B60J 3/02
[52] U.S. Cl. .................................... 296/97.9; 248/289.11
[58] Field of Search ................................. 296/97.1, 97.9, 296/97.12, 97.13; 248/288.11, 289.11, 299.1, 27.3; 411/48, 46, 45

[56]          References Cited

U.S. PATENT DOCUMENTS

| 3,017,217 | 1/1962  | Keating ........................................ 296/97 |
| 4,377,020 | 3/1983  | Vigo . |
| 4,902,068 | 2/1990  | Dowd et al. . |
| 4,913,484 | 4/1990  | Dowd et al. . |
| 5,082,323 | 1/1992  | Dowd et al. . |
| 5,163,795 | 11/1992 | Benoit et al. ............................... 411/45 |
| 5,201,564 | 4/1993  | Price ........................................ 296/97.9 |
| 5,236,240 | 8/1993  | Burns et al. ............................. 296/97.9 |
| 5,242,204 | 9/1993  | Kitterman et al. ...................... 296/97.9 |
| 5,451,022 | 9/1995  | Peterson ................................. 248/289.11 |
| 5,499,854 | 3/1996  | Crotty, III et al. . |
| 5,507,545 | 4/1996  | Krysiak ................................... 296/97.9 |

*Primary Examiner*—David M. Mitchell
*Attorney, Agent, or Firm*—Fay, Sharpe, Beall, Fagan, Minnich & McKee

[57]           ABSTRACT

An assembly for mounting a vehicle sunshade in a panel opening comprises a first mounting member that receives a sunshade mounting shaft to permit rotation thereof. A second mounting member closely receives the first mounting member. A plurality of resilient legs extend from the second mounting member. The legs are arranged to extend into the panel opening to retain the second mounting member in the panel opening. Cooperating surfaces on the interior of the legs define an axially outer first position of engagement and an axially inner second position of axial engagement. The first position prevents radial inward deflection of the legs to retain the first mounting member in the panel opening and the second position permits radial inward deflection to allow removal of the second mounting member from the panel opening.

8 Claims, 3 Drawing Sheets

VEHICLE SUNSHADE MOUNTING FASTENER

BACKGROUND OF THE INVENTION

The subject invention is directed to the motor vehicle art and, more particularly, to a mounting assembly for joining a sunshade to a vehicle headliner or roof support panel.

Sunshades and visors for motor vehicles are generally mounted in position adjacent a window by a support bracket assembly that permits the visor to pivot and swing from a storage position to various adjusted positions of use. The support bracket assemblies are typically joined to the vehicles headliner and the underlying roof panels and frames. In most instances, the bracket assemblies and the associated mechanical fasteners have been time consuming to install or remove. In addition, the fasteners often present a somewhat undesirable appearance.

SUMMARY OF THE INVENTION

The subject invention overcomes the noted drawbacks and disadvantages of the prior support bracket assemblies. Assemblies of the invention can comprise a very limited number of parts and can be quickly installed and removed without the use of tools or mechanical fasteners. Moreover, the installed assembly can present a simple and attractive, unobtrusive appearance.

In accordance with the subject invention, there is provided an assembly for mounting a vehicle sunshade in an opening in a panel comprising a vehicle sunshade having a mounting shaft extending therefrom. The mounting shaft terminates in an end portion having a central axis. A first mounting member with a sleeve-like body and a central opening receives the end portion of the mounting shaft to permit rotation of the shaft about the central axis within the central opening. A second mounting member includes an annular flange with a center opening closely receiving the first mounting member. The second member has a plurality of resilient legs located about the center opening that extend from the annular flange axially relative to the center opening. The legs are located and sized to deflect radially to extend into the panel opening. The legs include catch elements on the exterior thereof to hold the second mounting member in the panel opening. Cooperating surfaces are formed on the exterior of the sleeve-like body and the interior of the legs to define an axially outer first position of engagement and an axially inner second position of engagement. The first position is selected to prevent radial inward deflection of the legs to retain the first mounting member in the panel opening. The second position is located to permit radial inwardly deflection of the legs to thereby allow removal of the second mounting member from the panel opening. Additionally, latch means are carried by the second mounting member. The latch means are engageable with the first mounting member for preventing movement of the second mounting member axially out of the first mounting member while permitting selective movement from the first position to the second position to permit selective removal of the first mounting member from the opening in the panel.

Preferably, the latch means comprise a plurality of resilient latch elements extending from the annular flange adjacent the resilient legs. In the preferred form, each latch element carries a latch tooth for engagement with corresponding notches formed on the exterior of the first mounting member. In addition, there are preferably guide means between the first and second mounting members for preventing rotation of the second mounting member relative to the first mounting member.

In accordance with a more limited aspect, the guide means comprise cooperating axially-extending ribs and grooves formed on the first and second mounting members.

The first and second mounting members can be formed as molded plastic components. In addition, because of the manner in which the second mounting member engages within the panel opening, there is no need for associated fasteners or additional connection elements and the exterior flange which is in an exposed position can be an extremely simple and unobtrusive element. Additionally, installation and removal of the assembly merely requires the insertion of the second member into the panel opening followed by insertion of the first member into the center opening of the second mounting member. To remove the assembly, it is merely necessary to move the first mounting member to the axially inner second position to allow the resilient legs to deflect radially inward to permit them to disengage from the panel opening to allow the entire assembly to be axially withdrawn. The absence of any additional fasteners allows the installation and removal to be extremely rapid and performed manually without the use of any special tool.

As can be see from the foregoing, a primary object of the invention is the provision of an extremely simple assembly capable of mounting a vehicle sunshade without the use of separate fastener members.

Yet another object of the invention is the provision of an assembly of the type described which can be easily installed and removed manually without the use of tools.

A still further object of the invention is an extremely simple assembly of the type described which can be constituted of two relatively simple injection molded plastic components.

Yet another object is the provision of an apparatus and assembly of the type described which can have a highly simplified and pleasing appearance.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
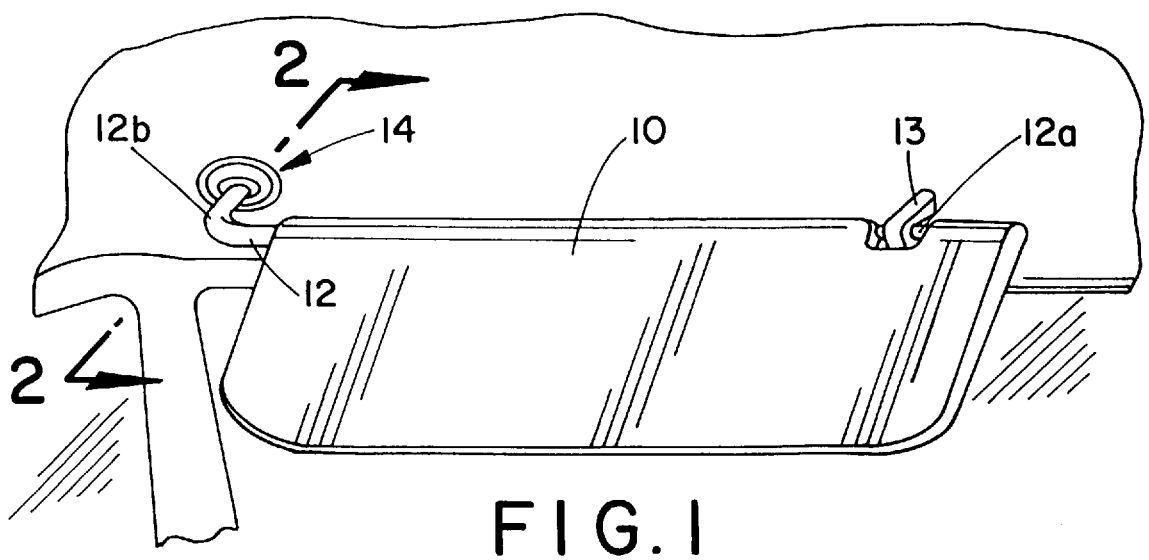
FIG. 1 is a perspective view showing a vehicle sunshade or visor installed above a front window of a vehicle using the assembly of the subject invention.
Figure 2:
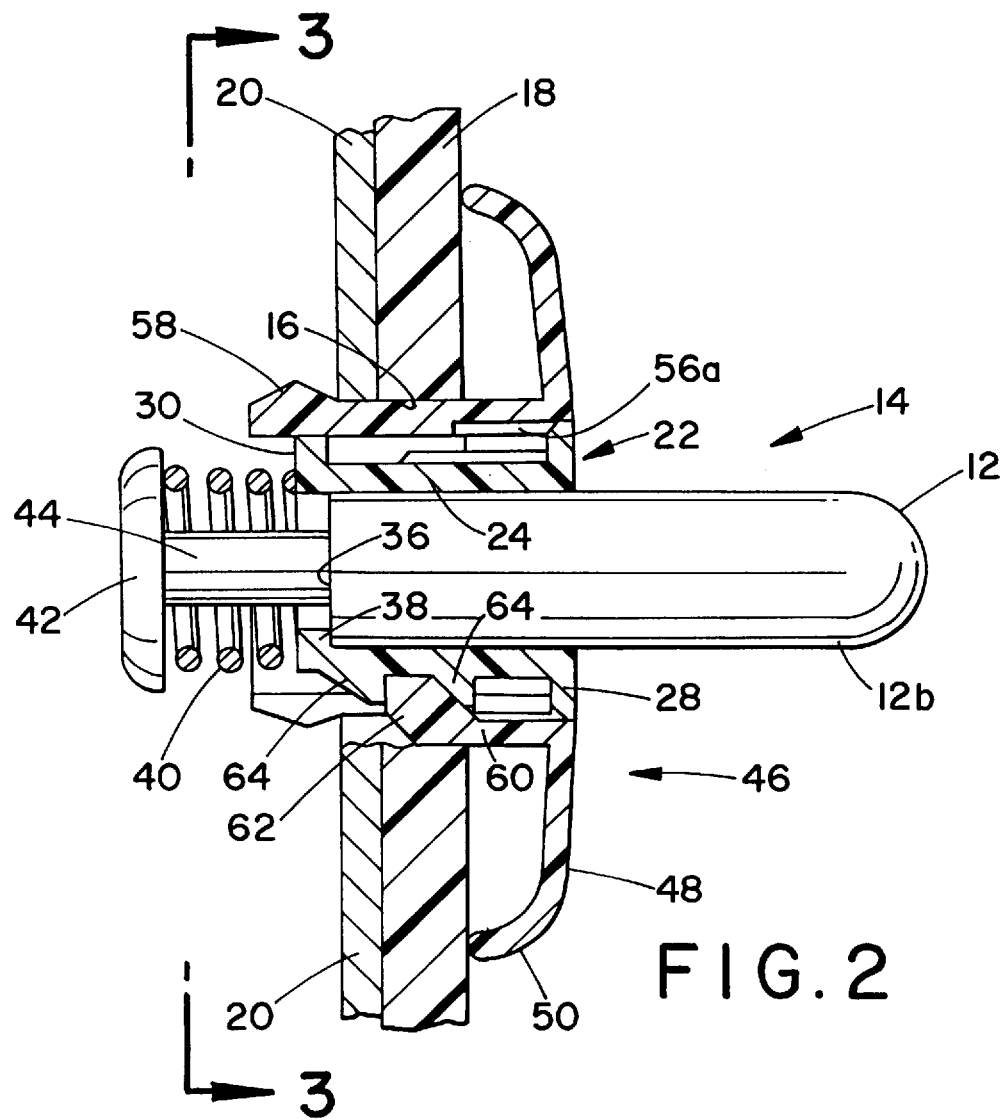
FIG. 2 is a cross-sectional view taken generally on line 2—2 of FIG. 1.

Referring now to the drawings wherein the showings are for the purposes of illustrating the preferred embodiment of the invention only and not for purposes of limiting same, FIGS. 1 and 2 show the overall arrangement wherein a vehicle sunshade or visor 10 is mounted and supported from a circular shaft or support element 12 that extends into and is connected to the vehicle headliner and roof panel by a mounting assembly 14 formed in accordance with a preferred embodiment of the invention. The actual details of the sunshade or visor 10 form no particular part of the invention but are illustrated as a relatively conventional visor structure. The shaft 12 is rotatably received through the upper edge of the visor 10 and has an exposed portion 12a that is releasably joined with a hook-type support 13 in a known manner. The support shaft 12 has a terminal end portion 12b that extends into and is retained in the mounting assembly 14 in a manner to subsequently be described. As can be seen from FIGS. 1 and 2, the assembly is arranged so as to be mounted within an opening 16 formed through the vehicle headliner 18 and an associated roof support or panel 20.

In its preferred form, the assembly 14 (see FIGS. 2–4) generally comprises a first mounting member 22 that has a generally sleeve-like central body 24 with a central opening 26 (FIG. 5) sized so as to closely but rotatably receive the end portion 12b of the shaft 12. Extending radially from the outer or right-hand end of the sleeve-like body 24 (as viewed in FIGS. 2, 5, and 6) is a small continuous flange 28. At three equally spaced circumferential positions (see FIG. 3 about the opposite end of the sleeve-like body 24 are three raised web elements 30. In its preferred form, the elements 30 each extend outwardly an equal amount and terminate in end faces 30a.

Referring again to the terminal end 12b of shaft 12, it will be seen that the terminal end is closely received in the central opening 24 and engages at a shoulder 36 with a partial lip 38 formed at the left-hand As noted earlier, FIG. 2 illustrates the position of the components when they are in the fully installed position. At this time, the web elements 30 are located behind the catch elements 58 and the legs 56 are thus maintained in their fully engaged position and cannot collapse or deflect radially inward. The assembly is thus firmly locked in its installed position. To prevent relative rotation between the first and second members, there are provided grooves and engaging ribs located between the exterior of first member 22 and the second mounting member 46. These cooperating ribs and grooves can best be seen in FIGS. 2 and 3. Specifically, each of the web elements 30 contains an axially extending groove 30a formed along the exterior thereof. Ribs 56a are formed and sized to engage with the grooves 30a and extend axially along the interior of each respective leg 56. This maintains the two mounting members in their properly aligned position shown in FIGS. 3 and 4.

To resiliently hold the components in the assembled position of FIG. 2, there are provided latch legs 60 which are located at spaced circumferential locations intermediate the resilient legs 56. The latch legs 60 carry enlarged latch elements 62 (see FIGS. 2, 5, and 6) biased into engagement with latch teeth 64 located at correspondingly spaced positions on the first mounting member 22. It should be noted that there are two of the latch teeth 64 carried at each radial location for engagement with the corresponding latch element 62. When the latch element 62 is positioned between the teeth 64 as shown in FIG. 2, the engaged and assembled condition is generally retained with the legs 56 held in their engaged position and prevented from deflecting radially inward. However, when the first mounting member 22 is moved inwardly to the position shown in FIG. 6, the webs 30 are located axially inward of the inner end of legs 56.

Legs 56 can then be deflected radially inward by pulling outwardly on the second member 46. This allows the entire end of the member 22. The cooperation between the shoulder 36 and the lip 38 limits the inward movement of the shaft end 12b within the central opening 24. The shaft end 12b is continuously biased in an inward direction relative to the opening 24 by a compression spring 40 (not shown in FIG. 3) acting between the end of the member 22 and a flange 42 connected to the end of shaft 12b by a relatively small diameter connecting element 44. The shaft 12b is thus retained within the central opening 24 but is permitted to rotate relative to element 22.

Figure 6:
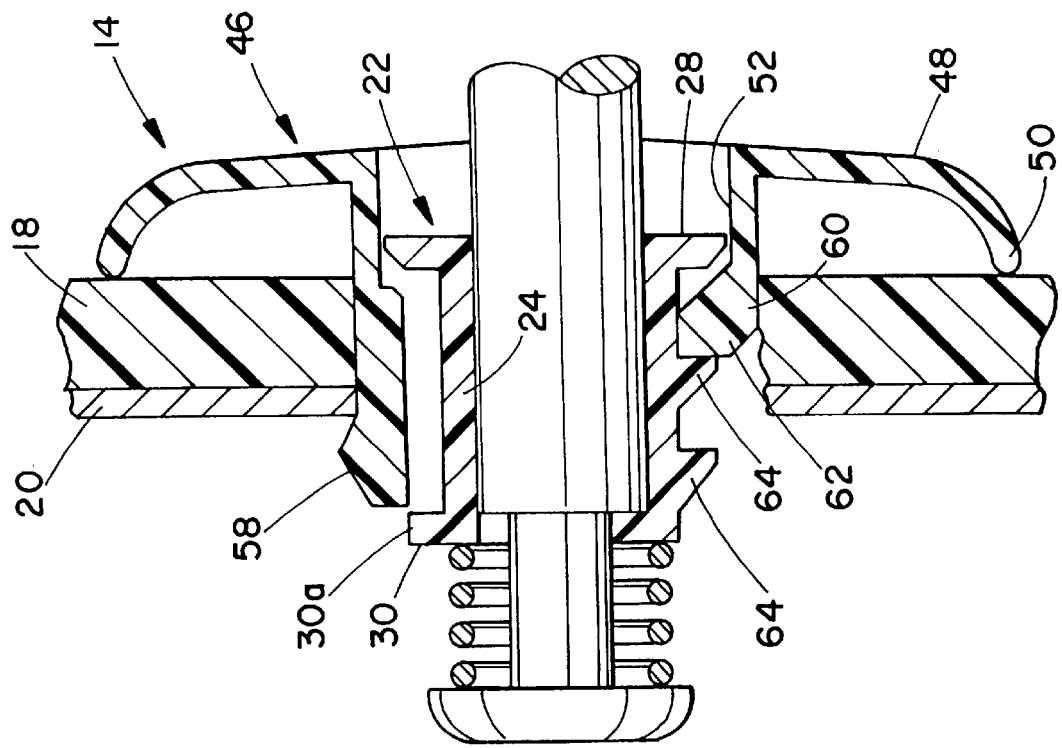
Figure 5:
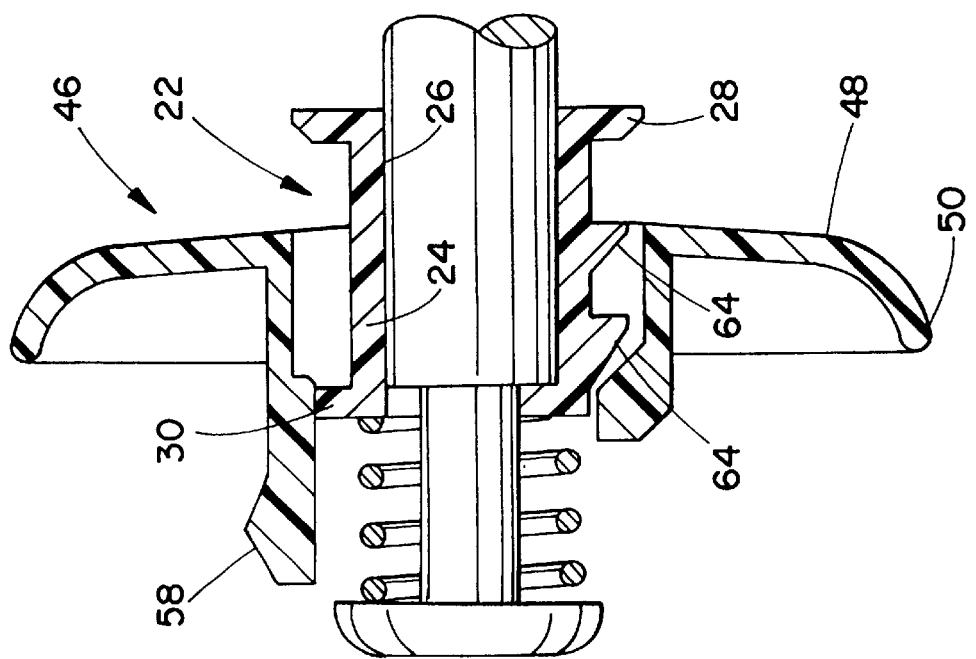
FIG. 5 is a cross-sectional view similar to FIG. 2 but showing the components of the assembly in a pre-installed relationship; and, FIG. 6 is a view similar to FIGS. 2 and 5 but showing the components in position to allow removal of the assembly from the panel opening.

The mounting member 22 is received within a second mounting member 46 that includes a relatively large diameter annular flange 48. The flange 48 is preferably contoured as shown and has a smooth outer surface that terminates in an axially cupped terminal edge 50. As best seen in FIGS. 2, 5, and 6, the annular flange 48 has a center opening 52 sized to closely receive the flange 28 and the webs 30 of the first mounting member 22.

Figure 3:
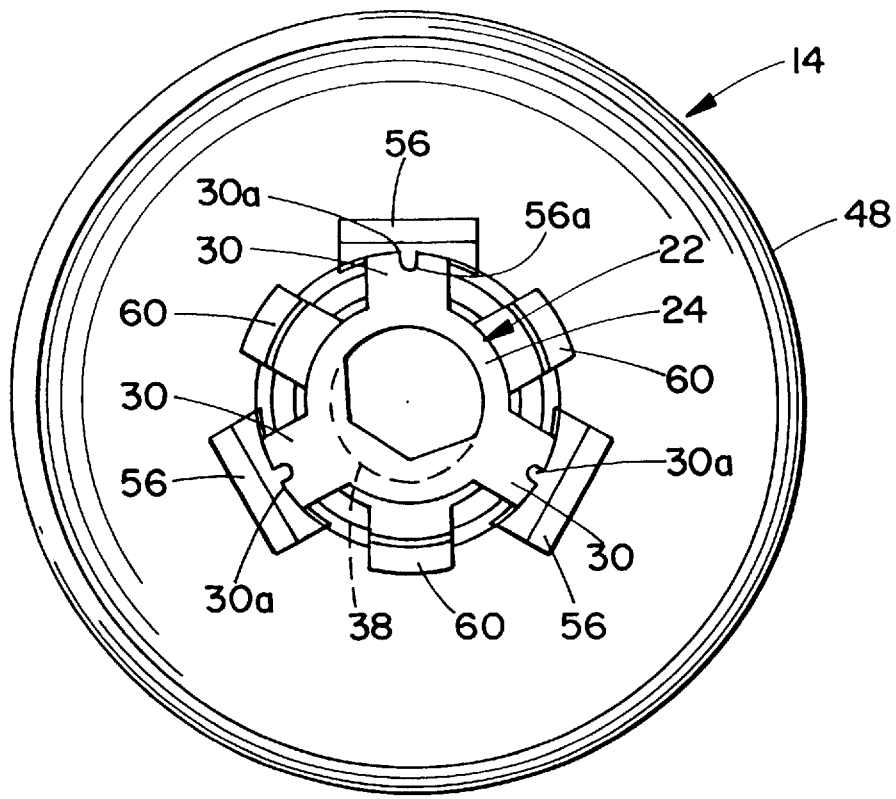
FIG. 3 is a view showing the major components of the assembly in their assembled position (the view is taken on line 3—3 of FIG. 2 with the associated headliner and body panel removed to more clearly show the details of construction)
Figure 4:
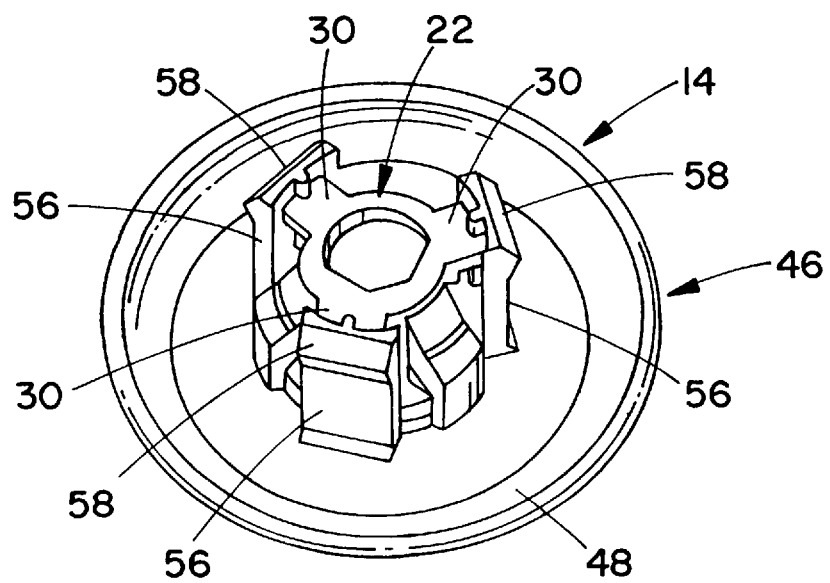
FIG. 4 is a perspective view of the assembly.

Extending axially from the annular flange 48 are three resilient legs 56 that are equally spaced circumferentially about the opening 52. Their relationship is best seen in FIGS. 3 and 4. The size and position of the legs 56 is controlled so as to allow them to be received within the headliner opening 16 when they are slightly deflected radially inward. Each of the legs 56 includes a catch element 58 located at a spaced axial distance from the interior of the flange 48. These latch elements 58 are sized and spaced so that when the second mounting member 46 is inserted into the headliner opening 16, the catch elements 58 engage about the axial inner edge of the opening 16 in the manner best depicted in FIGS. 2 and 6. The catch elements 58 thus prevent removal of the second mounting member from the opening 16 when the legs are maintained in their radial outer position shown in FIG. 2. assembly to be removed from its mounted position within the opening 16.

As can be seen from the foregoing, the entire assembly comprises only two relatively simple components and both installation and removal can be accomplished merely by manually moving the two components relative to one another. No separate mechanical fasteners or special tools are required.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An assembly mounting a vehicle sunshade in an opening in a panel comprising:

a vehicle sunshade having a mounting shaft extending therefrom, said mounting shaft terminating in an end portion having a central axis;

a first mounting member having a sleeve-like body with a central opening receiving said end portion of said mounting shaft to extend inwardly toward the opening in the panel and to permit rotation of said shaft about said central axis within said central opening;

a second mounting member including an annular flange with a center opening closely receiving said first mounting member, a plurality of resilient legs located about the center opening and extending from the annular flange axially inwardly relative to the center opening, said legs located and sized to extend into the panel opening and including catch elements on the exterior of the legs to retain the second mounting member in the panel opening;

cooperating surfaces on the exterior of said sleeve-like body and the interior of the legs defining an axially outer first position of engagement and an axially inner second posion of axial engagement, the first mounting member being axially inner to the second mounting member in said first position preventing radial inward deflection of the legs to retain the first mounting member in the panel opening and the first mounting member being axially outer to the second mounting member in said second position permitting radial inward deflection of said legs to allow removal of the second mounting member from the panel opening; and, latch means carried by the second mounting member and engageable with the first mounting member for preventing movement of the second mounting member axially out of the first mounting member while permitting selective movement from the first position to the second position.

2. The assembly as defined in claim 1 including means biasing said shaft in a direction into said central opening of said sleeve-like body.

3. The assembly as defined in claim 1 wherein said latch means comprise a plurality of resilient latch elements extending from the annular flange adjacent the resilient legs.

4. The assembly as defined in claim 3 wherein the resilient latch elements extend parallel to the resilient legs, each latch element carrying a latch tooth for engagement with corresponding notches formed on the exterior of the first mounting member.

5. The assembly as defined in claim 1 wherein guide means are provided for preventing rotation of the second mounting member relative to the first mounting member.

6. The assembly as defined in claim 5 wherein the guide means comprise ribs on one of the first and second mounting members and grooves on the other of the first and second mounting members.

7. The assembly as defined in claim 1 wherein the latch means include resilient elements extending axially relative to the central opening of said sleeve-like body.

8. The assembly as defined in claim 1 wherein the first and second members are formed from plastics materials.

* * * * *